W. W. SCOTT.
VEHICLE TIRE.
APPLICATION FILED OCT. 7, 1909.

952,951.

Patented Mar. 22, 1910.

WITNESSES
Samuel E. Wade.
L. A. Stanley

INVENTOR
WILLIAM W. SCOTT
BY Munn & Co.
ATTORNEYS

UNITED STATES PATENT OFFICE.

WILLIAM WALTER SCOTT, OF HAMPTON, VIRGINIA.

VEHICLE-TIRE.

952,951.  Specification of Letters Patent.  Patented Mar. 22, 1910.

Application filed October 7, 1909. Serial No. 521,591.

*To all whom it may concern:*

Be it known that I, WILLIAM W. SCOTT, a citizen of the United States, and a resident of Hampton, in the county of Elizabeth City and State of Virginia, have invented certain new and useful Improvements in Vehicle-Tires, of which the following is a specification.

My invention relates to vehicle tires for emergency purposes and it consists of the combinations, constructions, and arrangements of parts herein described and claimed.

An object of my invention is to provide a tire which may be carried with the vehicle, and which may be slipped on in lieu of a damaged tire so that the vehicle may be drawn back to the place where the damaged tire may be repaired.

A further object of my invention is to provide a device of simple construction for enabling one to place a tire on a rim and to tighten the same so as to prevent any danger of the tire becoming loosened and being forced from the rim, during the return of the vehicle.

Further objects and advantages will appear in the following specification and the novel features will be particularly pointed out in the appended claims.

My invention is illustrated in the accompanying drawings, in which—

Figure 1:
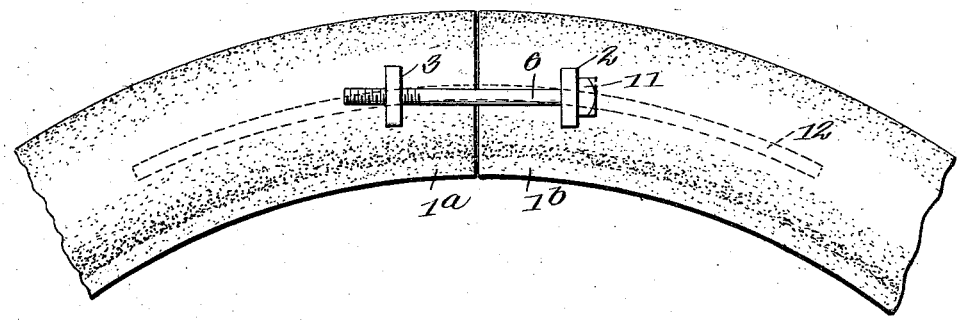
Figure 2:
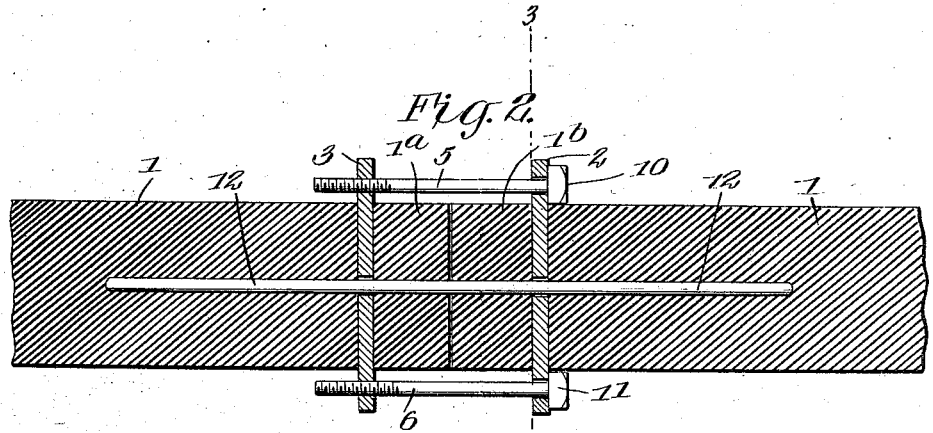
Figure 3:
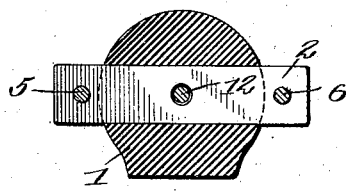
Figure 4:
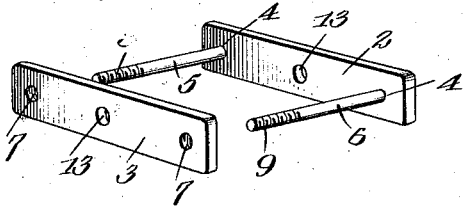

Figure 1 is a side view of a portion of the tire showing one embodiment of my invention. Fig. 2 is a section through the tire, and the fastening device. Fig. 3 is a section along the line 3—3 of Fig. 2. Fig. 4 is a perspective view showing the clamping plates.

In carrying out my invention, I make use of a solid tire body of any convenient form. The two ends of the tire, $1^a$ and $1^b$, respectively, are bent around and brought together. The transverse plate 2 passes through the end $1^b$ of the tire, while a similar transverse plate 3 is passed through the end $1^a$. The plate 2 is perforated at 4, to accommodate the bolts 5 and 6. The plate 3 has threaded openings 7 arranged to receive the threaded ends 8 and 9, respectively, of the bolts 5 and 6. The latter are provided with heads 10 and 11 which bear against the plate 2 when the tire is being tightened. In the construction of the tire, the plates are first inserted in the ends, as before mentioned, and a central rod 12 is passed through the central openings 13 in the plates, and is forced into the ends of the tire so as to be embedded therein, as shown in Fig. 2. The bolts 5 and 6 are then passed through the openings 4 and their ends are screwed into the opening 7 in the plate 3. The normal position of the bolts is such that the ends of the tire are far enough apart so as to permit the tire to be slipped over the rim of the wheel. Now by turning the heads 10 and 11, the end $1^a$ of the tire is drawn up toward the end $1^b$, the rod 12 guiding the movement of the ends of the tire toward each other. It will thus be seen that by having the tire of a size to accommodate a wheel of a given diameter, the emergency tire may be slipped on after the removal of the damaged tire.

A tire provided with a fastening device of the kind described above may be adjusted in a very short time, and be firmly held from displacement.

I claim:

1. An emergency tire comprising a solid body portion, transverse plates secured near the ends of said body portion, a central guide rod embedded in the ends of said tire, and arranged for movement through said plates, and bolts arranged to pass through one of said plates and provided with threaded ends arranged to engage threaded openings in the other of said plates.

2. An emergency tire comprising a solid body portion, transverse plates secured near the ends of said body portion, a guide member carried by the ends of said tire and arranged for movement through said plates and means for securing said plates together.

WILLIAM WALTER SCOTT.

Witnesses:
M. B. TIGNOR,
T. J. HASKINS.